B. W. HURD.
GEAR PUMP.
APPLICATION FILED SEPT. 24, 1919.
1,346,960.
Patented July 20, 1920.
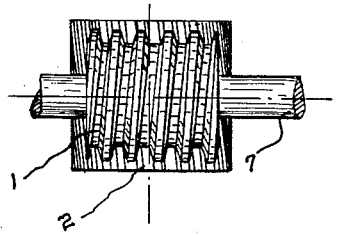
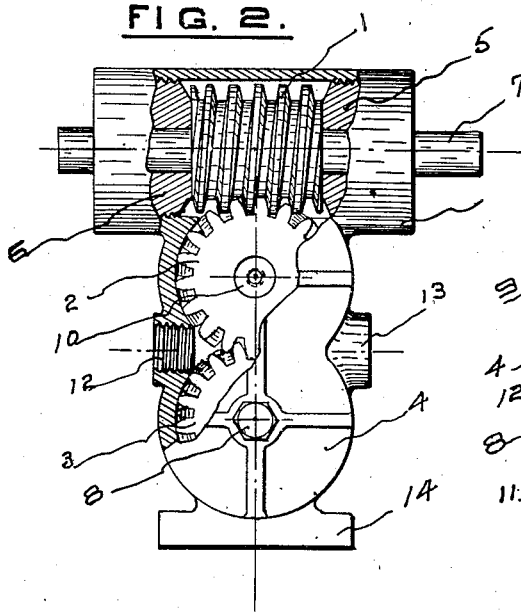
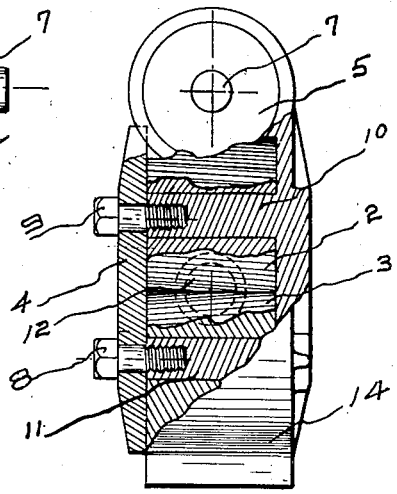
WITNESSES:
INVENTOR
Benjamin W. Hurd.

UNITED STATES PATENT OFFICE.

BENJAMIN W. HURD, OF SAN FRANCISCO, CALIFORNIA.

GEAR-PUMP.

1,346,960.

Specification of Letters Patent.

Patented July 20, 1920.

Application filed September 24, 1919. Serial No. 325,874.

*To all whom it may concern:*

Be it known that I, BENJAMIN W. HURD, a citizen of the United States, residing at San Francisco, in the county of San Francisco, State of California, have invented a new and useful Improvement in Gear-Pumps, of which the following is a specification.

This invention relates to a pump which is designed to pump fluids by the action of rotating gears, but differs from other gear pumps by having the gears cut on a spiral making an easier discharge. It also allows a direct reduction of pump speed through the action of a worm meshing with one of the gears; the spiral angle of the gear tooth being such that the worm meshes with it.

The object of the invention is to provide a pump of few parts and one which has an easy discharge, at the same time doing away with all the rotating shafts and packing glands on the gears or gear shaft. The pump which is illustrated as an embodiment of the invention has a body, a cap, screws to hold cap to body, spiral gears and worm inclosed in said body; a worm mounted on suitable bearing or bearings, said worm meshing with one of the spiral gears.

Referring to the accompanying drawing, Figure 1 is a view of the worm and the upper spiral gear showing positions of same when in mesh, 1 being the worm, 2 the upper spiral gear and 7 the worm shaft.

Fig. 2 is an elevation, partly broken away showing worm 1, upper spiral gear 2, lower spiral gear 3, cap 4, body 14; 5 and 6 are bearings for worm shaft 7 to rotate in, 8 is a cap screw holding the lower part of cap in place; 12 and 13 are inlet and outlet in the body of the pump for incoming and outgoing fluid; as the pump rotates in either direction, these openings may be either inlet or outlet; the inlet being the one toward which the teeth are traveling when taken on the center line of the openings.

Fig. 3 is a side elevation partly broken away showing cap 4 held to body 14 by screws 8 and, which screw into the stationary shafts 10 and 11, which are cast or fastened to body 14; 5 is worm shaft bearing, 7 is a worm shaft, 2 is the upper spiral gear which is in mesh with the worm; 3 is the lower spiral gear which is in mesh with the upper spiral gear; the action of the pump being as follows: The power is applied to worm shaft 7, the worm 1 being fastened to or part of the shaft turns with the shaft, the worm 1 being in mesh with the upper spiral gear 2, turns gear 2; gear 2 meshing on the bottom side with the upper side of spiral gear 3 turns gear 3; the incoming fluid fills the gear teeth and is carried around and squeezed out on the opposite side when the upper and lower gears mesh, the fluid in the teeth of the upper gear is partly forced out by the worm and is carried around the worm and discharged back into the teeth of gear 2 on the opposite end of the worm.

Having described my pump in detail the invention claimed is:

1. An internally reduced drive gear pump having a liquid tight case with an inlet and an outlet, said case inclosing a pair of meshing helical gears and a worm designed to rotate in said case; the worm shaft axis to be at right angle to the axis of the gears and to mesh with and drive one of said helical gears for the purpose of reducing the speed and increasing the power.

2. The combination in an internally reduced drive gear pump of a liquid tight case having an inlet and an outlet, and a removable cover, said case inclosing two meshed helical or spiral gears and a worm designed to rotate in said case; said worm to mesh at right angles with the helical or spiral gears and driving same for the purpose of circulating or forcing fluids through said inlet and outlet.

3. The combination in a gear pump designed to force liquids, of a case having an inlet and an outlet, a tight fitting removable cover, a pair of helical meshing gears rotating in said case, a worm meshing with said gears and rotating in said case to drive said gears, substantially as described.

BENJAMIN W. HURD.

Witnesses:
C. C. PUDDY,
ANNIE C. HURD.